(Model.)
E. EBI.
BINDING ATTACHMENT FOR HARVESTERS.
No. 278,521. Patented May 29, 1883.
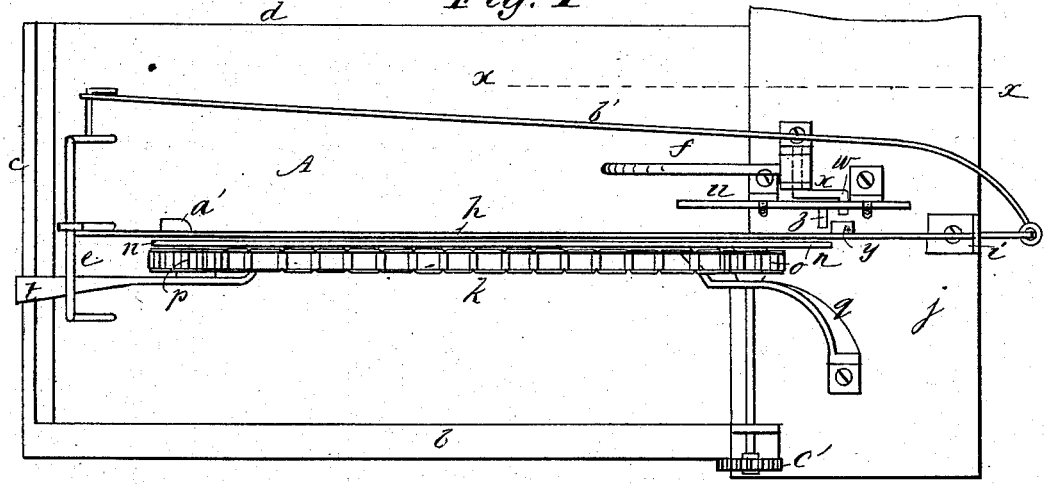
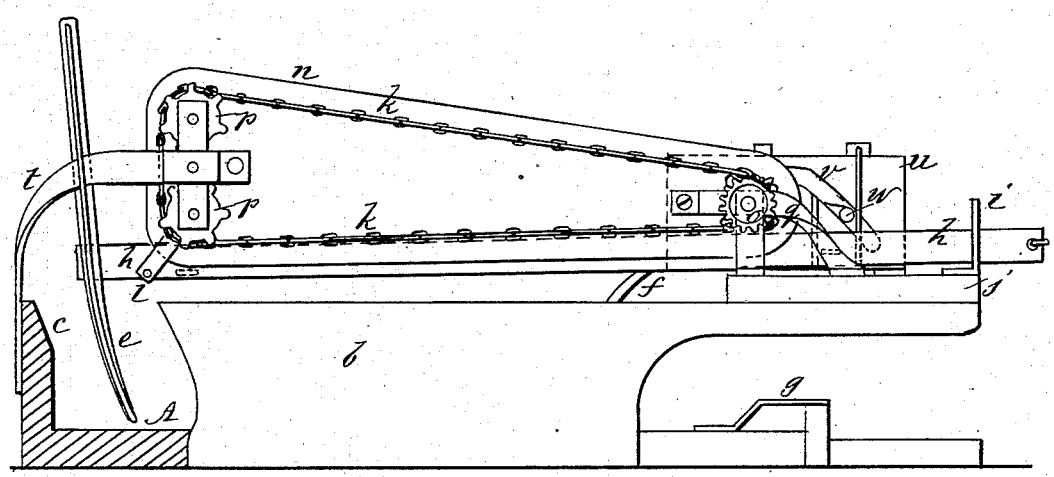
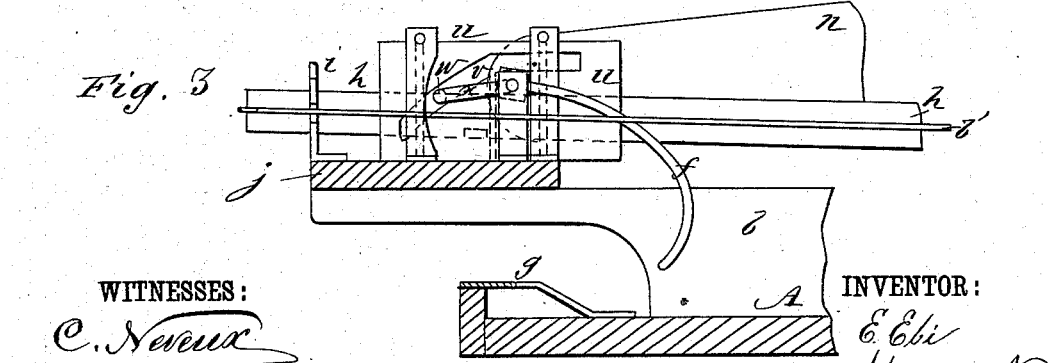
WITNESSES:
C. Neveux
C. Sedgwick
INVENTOR:
E. Ebi
BY Munn & Co.
ATTORNEYS.

UNITED STATES PATENT OFFICE.

EDWARD EBI, OF CEDAR RAPIDS, IOWA.

BINDING ATTACHMENT FOR HARVESTERS.

SPECIFICATION forming part of Letters Patent No. 278,521, dated May 29, 1883.

Application filed June 27, 1882. Renewed April 30, 1883. (Model.)

*To all whom it may concern:*

Be it known that I, EDWARD EBI, of Cedar Rapids, in the county of Linn and State of Iowa, have invented a new and Improved Binding Attachment for Harvesters, of which the following is a full, clear, and exact description.

My invention consists of apparatus to be used in connection with self-raking harvesters to receive the gavels as they are discharged from the platform of the harvester and deliver them to the binder-arm of binding machinery, to be bound thereby, as hereinafter fully described.

Reference is to be had to the accompanying drawings, forming part of this specification, in which similar letters of reference indicate corresponding parts in all the figures.

Figure 1 is a plan view of my improved attachment. Fig. 2 is a rear side elevation of the said attachment with a part sectioned. Fig. 3 is a section of part of the apparatus on line $x\,x$, Fig. 1.

A represents a platform of suitable length and breadth, and having a rear end board, $b$, and an outer side board, $c$, to be attached to the rear of the platform of a self-raking harvester, so that the gavels raked together and brushed off the said platform will be received over the front edge, $d$, onto this platform, parallel with side $c$, to be taken by the rake-head $e$ and delivered under the binder-arm $f$ of a binding-machine, whereof the twisting or tying mechanism is to be located under the plate $g$, located at the inner side of the platform A, where, after binding, the bundles will be discharged onto the ground. The rake-head $e$ is connected to a staff, $h$, extending the whole length of the platform and working through a slotted guide-post, $i$, mounted on the elevated platform $j$, over the binding-table, and this staff is connected near the rake-head to an endless chain, $k$, by a block, $l$, which is pivoted to the staff, so as to swing around the ends of the guideway $n$, along which the chain is made to travel by the driving-wheel $o$ and the carriers $p$, the chain being on one side of the guideway and the rake-staff on the other, so that said guide keeps the rake in position effectually. The chain-wheels are supported in bearers $q$ and $t$, suitably attached to the platform. The rake-staff $h$ is made to work the binder-arm $f$ of the binding mechanisms by means of the sliding plate $u$, having a cam-slot $v$, in which the wrist $w$ of a crank, $x$, of the said arm is arranged to work, so that the arm will vibrate when the slide $u$ is shifted, and the slide is made to shift so as to raise the arm $f$ to allow rake-head $e$ to pass the gavel under it, by the stud $y$ of the staff $h$ striking stud $z$ of slide $u$, just before the rake-head $e$ reaches the end of its outward stroke. The arm $f$ then rests in the elevated position till the gavel has been passed under it by the rake-head, immediately after which stud $a'$ of the staff $h$ strikes stud $z$ of slide $u$, shifting it back again to its first position and swinging arm $f$ down around the gavel into the position for the twisting or other band-securing devices to operate, which devices may be of any approved form or arrangement, and are not shown herein because they form no part of the invention herein claimed. The rake-head is connected with the rake-staff $h$ at its end opposite to the head by a stay-rod, $b'$. The power for working the rake will be taken from the harvester by any approved arrangement of devices to be connected with the driving-wheel $c'$.

Having thus fully described my invention, I claim as new and desire to secure by Letters Patent—

1. The combination, with the rake-head $e$ and its staff $h$, having the studs $a'\,y$, of the slotted sliding plate $u$, having the stud $z$, and the vibrating binder-arm connected with the slotted plate, as described.

2. The combination of rake-staff $h$, sliding cam-slotted plate $u$, and the binder-arm $f$, said staff and cam-plate being provided with studs, whereby the cam-plate is operated by the rake-staff, and the crank-wrist of the binder-arm being arranged in the slot of the cam-plate, substantially as described.

EDWARD EBI.

Witnesses:
JOHN B. BUTLER,
J. B. MOORE.